(12) United States Patent
Del Valle

(10) Patent No.: US 6,609,478 B2
(45) Date of Patent: Aug. 26, 2003

(54) TREADMILL SYSTEM

(76) Inventor: Juanquin Del Valle, 7 Pennsylvania Ave., Dorothy, NJ (US) 08317

( * ) Notice: Subject to any disclaimer, the term of this patent is extended or adjusted under 35 U.S.C. 154(b) by 0 days.

(21) Appl. No.: 09/727,420

(22) Filed: Dec. 1, 2000

(65) Prior Publication Data

US 2002/0066416 A1 Jun. 6, 2002

(51) Int. Cl.⁷ .............................................. A01K 15/02
(52) U.S. Cl. ...................................... 119/703; 482/54
(58) Field of Search ................................. 119/702, 703, 119/845, 847, 846; 482/54, 51; 472/48

(56) References Cited

U.S. PATENT DOCUMENTS

| | | | | |
|---|---|---|---|---|
| 3,709,197 A | * | 1/1973 | Moseley | 119/29 |
| 4,095,561 A | * | 6/1978 | Ruetenik | 119/29 |
| 4,205,628 A | * | 6/1980 | Null | 119/29 |
| 4,227,487 A | * | 10/1980 | Davis | 119/29 |
| 4,332,217 A | | 6/1982 | Davis | |
| 4,819,583 A | * | 4/1989 | Guerra | 119/29 |
| 5,081,991 A | * | 1/1992 | Chance | 119/29 |
| 5,100,127 A | * | 3/1992 | Melnick et al. | 119/29 |
| D333,887 S | | 3/1993 | Dowler | |
| 5,192,255 A | * | 3/1993 | Dalebout et al. | 482/54 |
| 5,277,150 A | * | 1/1994 | Rhodes | 119/700 |

* cited by examiner

Primary Examiner—Thomas Price

(57) ABSTRACT

A treadmill system for providing a safe and convenient method of exercise for quadrepedal animals under 150 pounds. The treadmill system includes a frame assembly having a first and second pair of vertical support members, a first and second lateral support member extending between the vertical support members, and a central brace member extending between the lateral support members; a tread assembly rotatably coupled to the frame assembly and designed for providing a running surface for a quadrapedal animal under 150 pounds; and a drive assembly mounted to the frame assembly and coupled to the tread assembly for rotating the tread assembly.

17 Claims, 5 Drawing Sheets

TREADMILL SYSTEM

BACKGROUND OF THE INVENTION

1. Field of the Invention

The present invention relates to exercise treadmills and more particularly pertains to a new treadmill system for providing a safe and convenient method of exercise for quadrepedal animals under 150 pounds.

2. Description of the Prior Art

The use of exercise-treadmills is known in the prior art. More specifically, exercise treadmills heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,277,150; 4,205,628; 4,095,561; 4,332,217; 4,819,583; and U.S. Pat. No. Des. 333,887.

While these devices fulfill their respective, particular objectives and requirements, the aforementioned patents do not disclose a new treadmill system. The inventive device includes a frame assembly having a first and second pair of vertical support members, a first and second lateral support member extending between the vertical- support members, and a central brace member extending between the lateral support members; a tread assembly rotatably coupled to the frame assembly and designed for providing a running surface for a quadrapedal animal under 150 pounds; and a drive assembly mounted to the frame assembly and coupled to the tread assembly for rotating the tread assembly.

In these respects, the treadmill system according to the present invention substantially departs from the conventional concepts and designs of the prior art, and in so doing provides an apparatus primarily developed for the purpose of providing a safe and convenient method of exercise for quadrepedal animals under 150 pounds.

SUMMARY OF THE INVENTION

In view of the foregoing disadvantages inherent in the known types of exercise treadmills now present in the prior art, the present invention provides a new treadmill system construction wherein the same can be utilized for providing a safe and convenient method of exercise for quadrepedal animals under 150 pounds.

The general purpose of the present invention, which will be described subsequently in greater detail, is to provide a new treadmill system apparatus and method which has many of the advantages of the exercise treadmills mentioned heretofore and many novel features that result in a new treadmill system which is not anticipated, rendered obvious, suggested, or even implied by any of the prior art exercise treadmills, either alone or in any combination thereof.

To attain this, the present invention generally comprises a frame assembly having a first and second pair of vertical support members, a first and second lateral support member extending between the vertical support members, and a central brace member extending between the lateral support members; a tread assembly rotatably coupled to the frame assembly and designed for providing a running surface for a quadrapedal animal under 150 pounds; and a drive assembly mounted to the frame assembly and coupled to the tread assembly for rotating the tread assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new treadmill system apparatus and method which has many of the advantages of the exercise treadmills mentioned heretofore and many novel features that result in a new treadmill system which is not anticipated, rendered obvious, suggested, or even implied by any of the prior art exercise treadmills, either alone or in any combination thereof.

It is another object of the present invention to provide a new treadmill system which may be easily and efficiently manufactured and marketed.

It is a further object of the present invention to provide a new treadmill system which is of a durable and reliable construction.

An even further object of the present invention is to provide a new treadmill system which is susceptible of a low cost of manufacture with regard to both materials and labor, and which accordingly is then susceptible of low prices of sale to the consuming public, thereby making such treadmill system economically available to the buying public.

Still yet another object of the present invention is to provide a new treadmill system which provides in the apparatuses and methods of the prior art some of the advantages thereof, while simultaneously overcoming some of the disadvantages normally associated therewith.

Still another object of the present invention is to provide a new treadmill system for providing a safe and convenient method of exercise for quadrepedal animals under 150 pounds.

Yet another object of the present invention is to provide a new treadmill system which includes a frame assembly having a first and second pair of vertical support members, a first and second lateral support member extending between the vertical support members, and a central brace member extending between the lateral support members; a tread assembly rotatably coupled to the frame assembly and designed for providing a running surface for a quadrapedal animal under 150 pounds; and a drive assembly mounted to the frame assembly and coupled to the tread assembly for rotating the tread assembly.

Still yet another object of the present invention is to provide a new treadmill system that can be used to maintain the conditioning of an animal inside during inclement weather.

Even still another object of the present invention is to provide a new treadmill system that improves the physical and emotional health of an animal through exercise.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
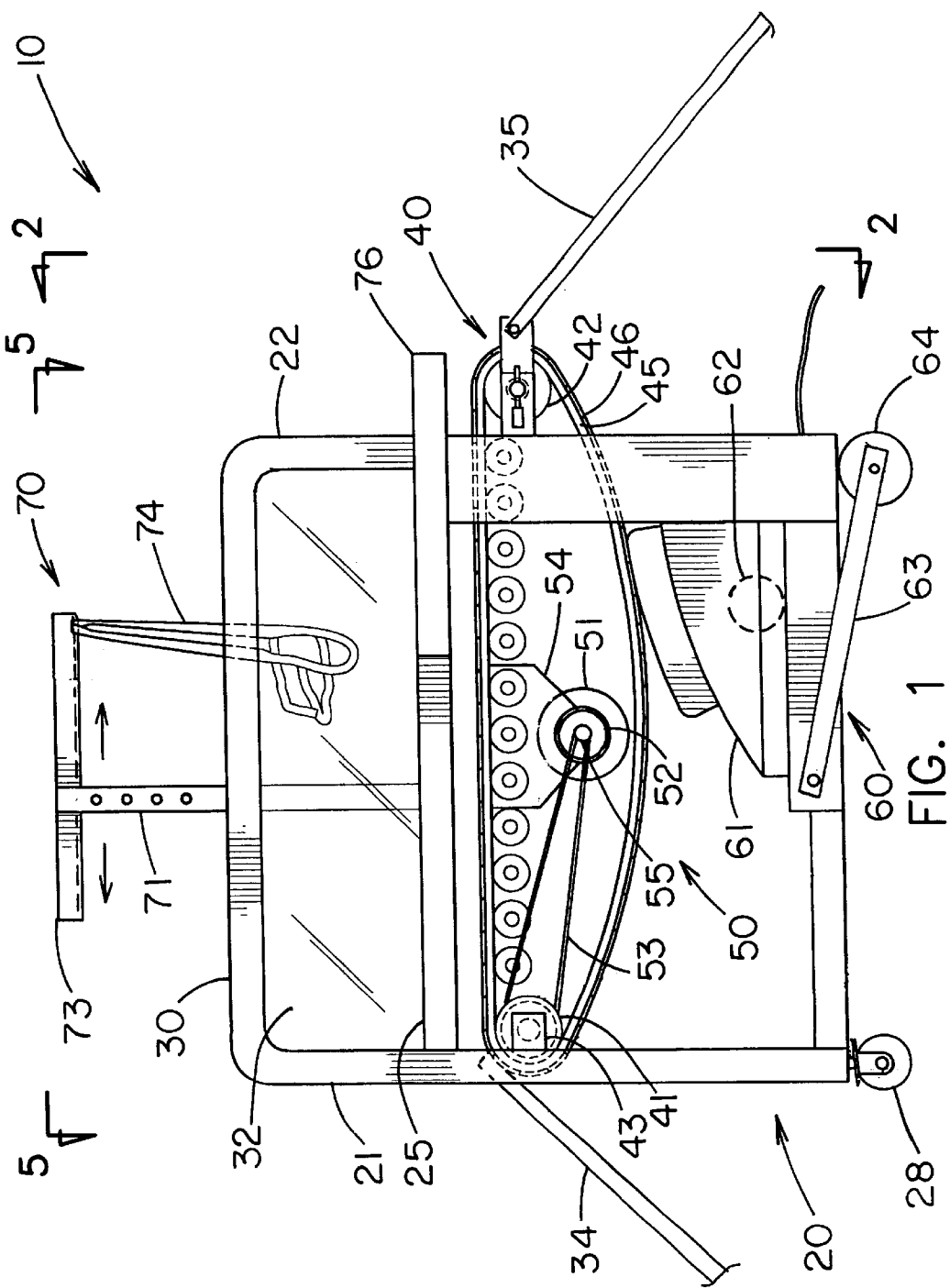
FIG. 1 is a schematic front view of a new treadmill system according to the present invention.
Figure 2:
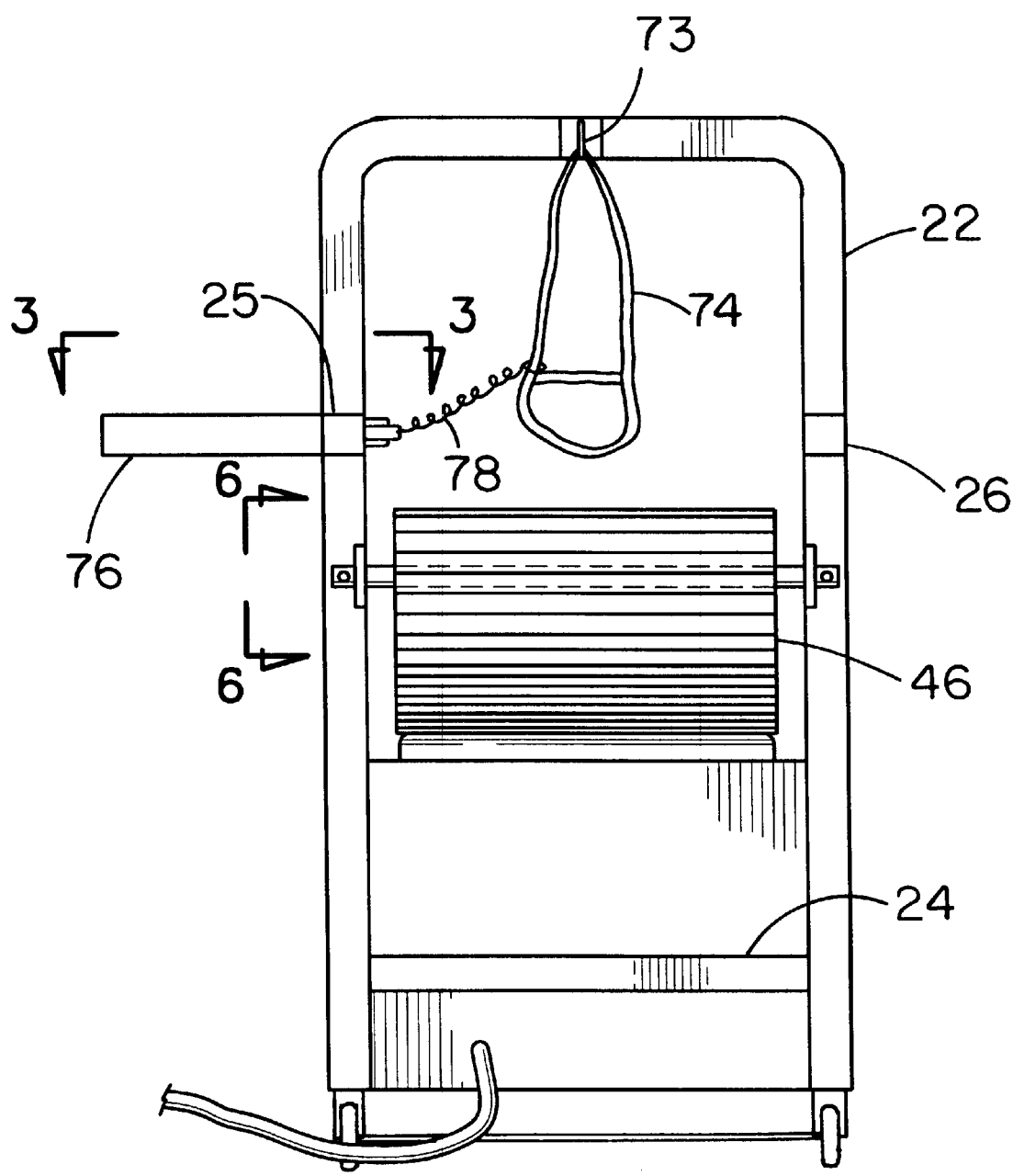
FIG. 2 is a schematic side view of the present invention.
Figure 3:
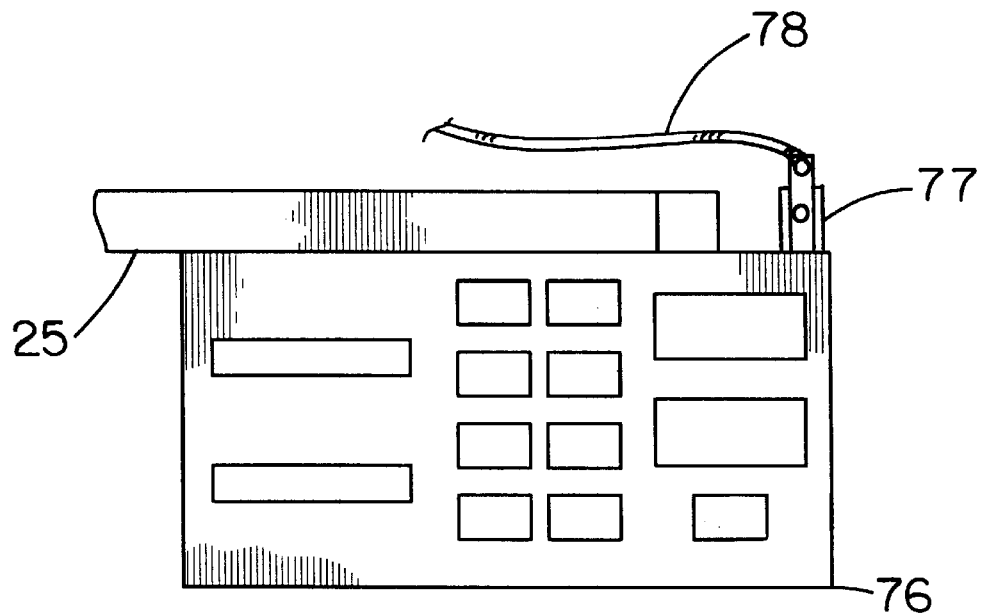
FIG. 3 is a schematic detail view of the control assembly of the present invention taken along line 3—3 of FIG. 2.
Figure 4:
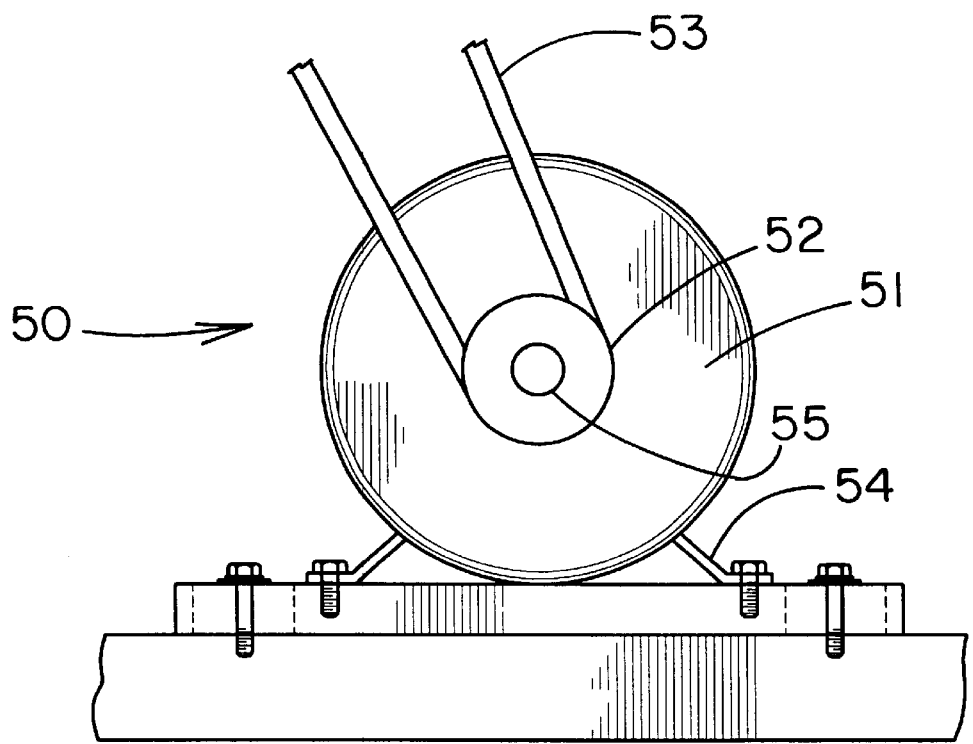
FIG. 4 is a schematic detail view of the drive motor of the present invention.
Figure 5:
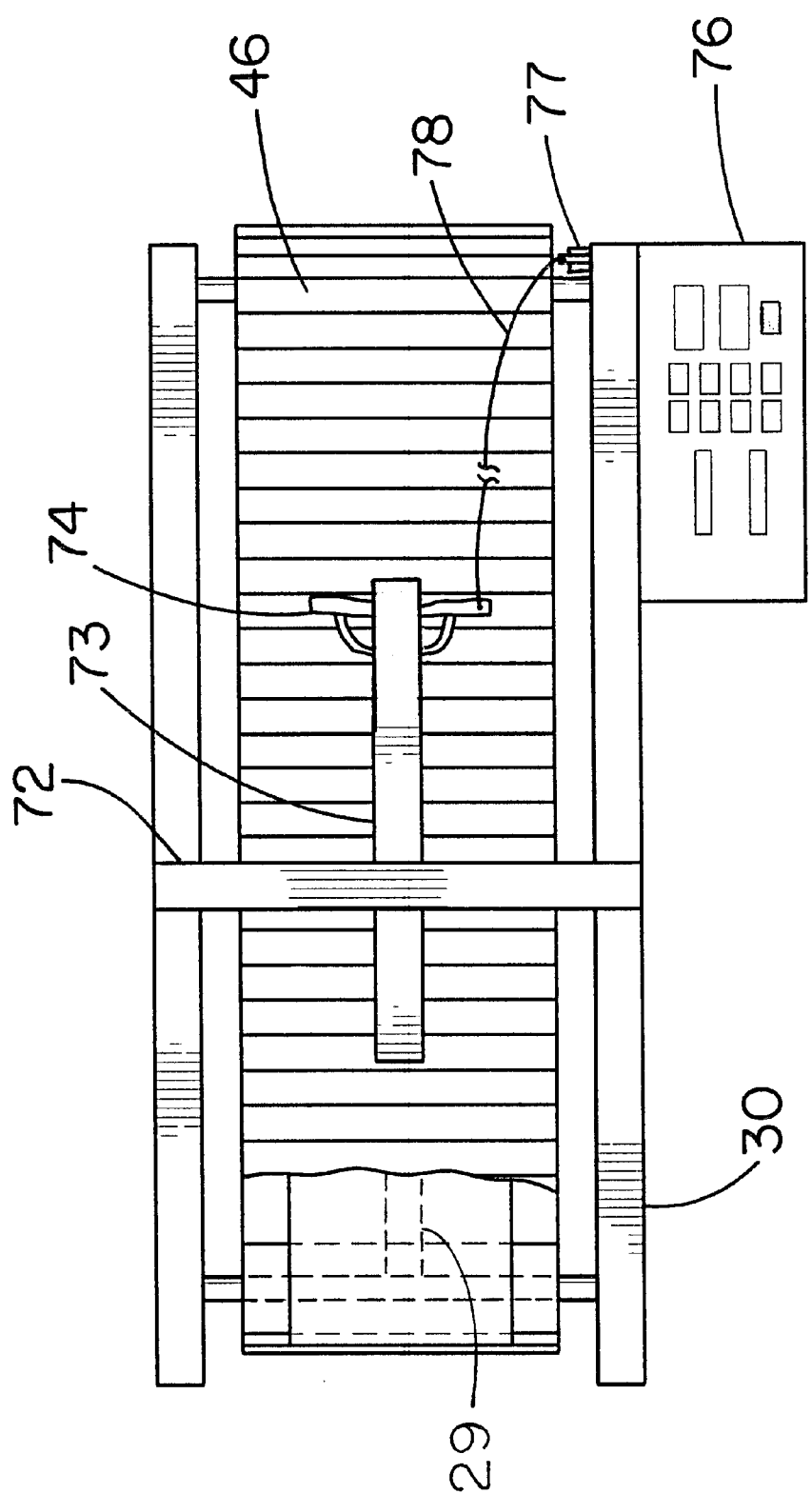
FIG. 5 is a schematic top view of the present invention taken along line 5—5 of FIG. 1.
Figure 6:
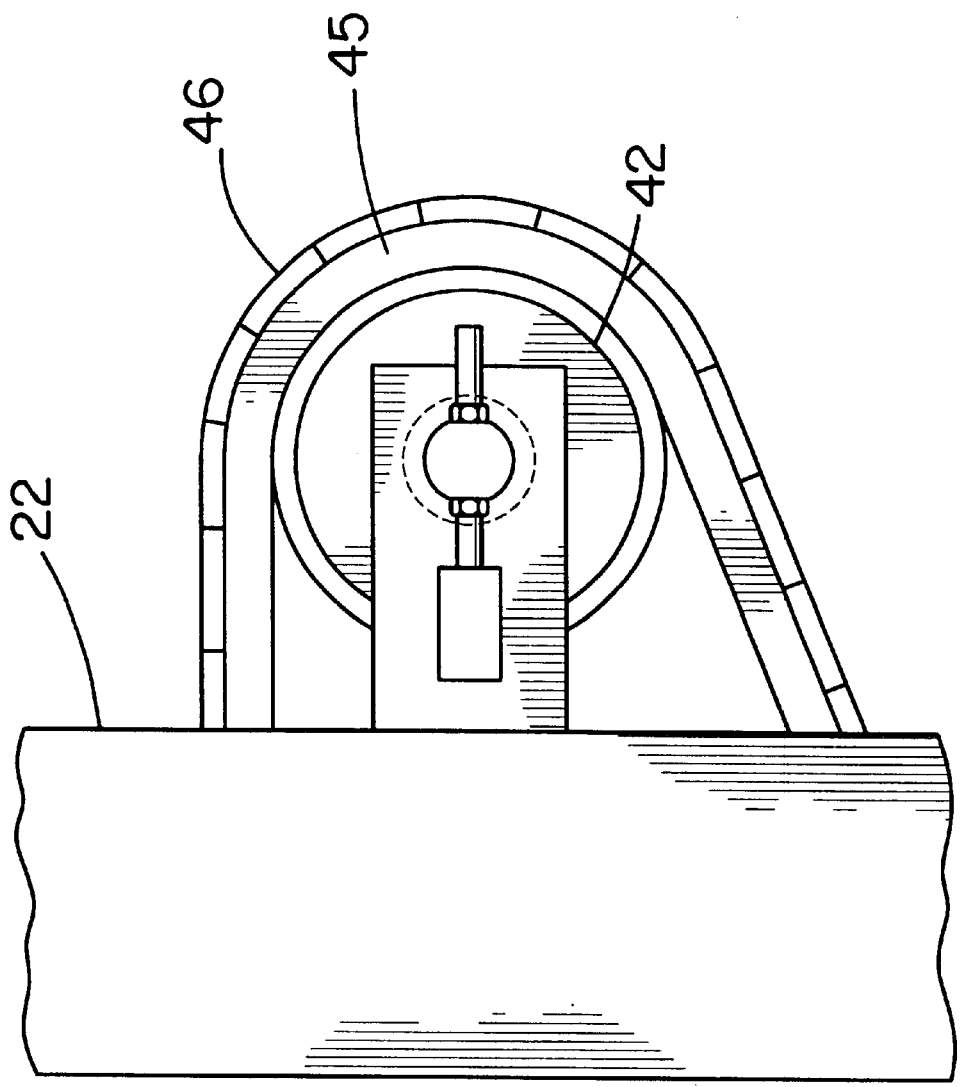
FIG. 6 is a schematic detail view of the tensioning roller of the present invention taken along line 6—6 of FIG. 2.

With reference now to the drawings, and in particular to FIGS. 1 through 6 thereof, a new treadmill system embodying the principles and concepts of the present invention and generally designated by the reference numeral 10 will be described.

As best illustrated in FIGS. 1 through 6, the treadmill system 10 generally comprises a frame assembly 20, a harness assembly 70, an incline assembly 60, a drive assembly 50, a tread assembly 40, and a control assembly 76.

The frame assembly 20 comprises a first 21 and second pair of vertical support members 22, a first 23 and second lateral support member 24, a first 25 and second longitudinal support member 26, a pair of said panel assemblies 27, and a pair of wheels 28.

Each one of the first pair of vertical support members 21 includes a first end and a second end.

The first lateral support member 23 extends between the first end of a first one of the first pair of vertical support members 21 and the first end of a second one of the first pair of vertical support members 22.

Each one of the second pair of vertical support members 22 includes a first end and a second end.

The second lateral support member 24 extends between the first end of a first one of the second pair of vertical support members 22 and the first end of a second one of the second pair of vertical support members 22.

A central brace member 29 extends between a medial portion of the first lateral support member 23 and a medial portion of the second lateral support member 24.

The first longitudinal brace 25 extends between a medial portion of the first one of the first pair of vertical support members 21 and a medial portion of a first one of the second pair of vertical support members 22.

The second longitudinal brace 26 extends between a medial portion of the second one of the first pair of vertical support members 21 and a medial portion of the second one of the second pair of vertical support members 22.

The first 25 and second longitudinal members 26 substantially provide rigidity to the frame assembly 20 along a longitudinal axis of the frame assembly 20.

Each one of the pair of wheels 28 is coupled to the first end of an associated one of the first pair of vertical support members 21. The pair of wheels 28 is for facilitating moving the treadmill system 10.

Each one of the pair of side panel assemblies 27 is coupled to the second ends of the vertical support members 21,22. A first one of the side panel assemblies 27 extends between the first one of the first pair of vertical support members 21 and the first one of the second pair of vertical support members 22. A second one of the side panel assemblies 27 extends between the second one of the first pair of vertical support members 21 and the second one of the second pair of vertical support assemblies 22.

Each one of the pair of side panel assemblies 27 further comprises an upper crossbar member 30, a lower crossbar member 31, and a side panel member 32.

The upper crossbar member 30 extends between an associated pairing of one of the first vertical support members 21 and one of the second vertical support members 22. The upper crossbar member 30 is positioned such that the upper crossbar member 30 abuts a top edge of each one of the associated pairing of one of the first vertical support members 21 and one of the second vertical support members 22.

The lower crossbar member 31 extends between the associated pairing of one of the first vertical support members 21 and one of the second vertical support members 22. The lower crossbar member 31 is in a substantially parallel spaced relationship with the upper crossbar member 30.

The side panel member 32 is coupled to the upper 30 and lower crossbar members 31. The side panel member 32 extends substantially between the associated pairing of one of the first vertical support members 21 and one of the second vertical support members 22.

The tread assembly 40 is rotatably coupled to the frame assembly 20. The tread assembly 40 is designed for providing a running surface for a quadrapedal animal under 150 pounds.

The tread assembly 40 further comprises a drive roller 41, a tensioning roller 42, a pair of tread support members 43, a plurality of support rollers 44, a backing member 45, and a plurality of tread members 46.

The drive roller 41 includes a first end and a second end. The drive roller 41 is substantially cylindrical and includes an annular groove located adjacent to the first end. The first end is rotatably coupled to a medial portion of the first one of the first pair of vertical support members 21. The second end is rotatably coupled to a medial portion of the second one of the first pair of vertical support members 21.

The tensioning roller 42 includes a first end and a second end. The tensioning roller 42 is substantially cylindrical. The first end is rotatably coupled to a medial portion of the first one of the second pair of vertical support members 22. The second end is rotatably coupled to a medial portion of the second one of the second pair of vertical support members 22.

Each of the pair of tread support members 43 extends between the drive roller 41 and the tensioning roller 42. A first one of the tread support members 43 extends between the first end of the drive roller 41 and the first end of the tensioning roller 42. A second one of the pair of tread support members 43 extends between the second end of the drive roller 41 and the second end of the tensioning roller 42.

Each one of the plurality of support rollers 44 is rotatably coupled to the pair of tread support members 43, and positioned such that a longitudinal axis of each of the plurality of support rollers 44 is in a substantially perpendicular relationship with a longitudinal axis of each of the tread support members 43.

The backing member 45 includes a first end and a second end. The first end is coupled to the second end. The backing member 45 is positioned such that an interior surface of the backing member 45 abuts and outer surface of the drive roller 41, the tensioning roller 42, and the plurality of support rollers 44.

The plurality of tread members 46 is coupled to the backing member 45 such that a bottom surface of each one of the plurality of tread members 46 abuts an outer surface of the backing member 45.

In an embodiment each one of the plurality of tread members 46 comprises a material consisting of the group of wood, rubber, or plastic.

The drive assembly 50 is mounted to the frame assembly 20 and coupled to the tread assembly 40. The drive assembly 50 provides rotation for the tread assembly 40.

In an embodiment the drive assembly 50 further comprises a drive motor 51, a drive pulley 52, a drive belt 53, and a mounting bracket 54. The drive motor 51 includes a rotating shaft 55, which extends from an end portion. The drive pulley 52 is coupled to the rotating shaft 55. The drive pulley 52 includes an annular groove. The drive belt 53 extends from the drive pulley 52 to the drive roller 41. The drive belt 53 is positioned in the annular groove of the drive pulley 52 and an annular groove of the drive roller 41. The drive belt 52 transfers rotational energy from the drive motor 51 to the drive roller 41 such that rotation of the shaft 55 rotates the drive roller 41. The mounting bracket 54 is preferably coupled to a medial portion of the tread assembly 40. The mounting bracket 54 is for holding the drive motor 51 in a static position relative to the frame assembly 20.

The incline assembly 60 is coupled to the frame assembly 20. The incline assembly 60 is for selectively raising the second pair of vertical support members 22. Thus the tread assembly 40 inclines relative to a support surface such as the ground.

In an embodiment the incline assembly 60 further comprises an incline housing 61, an incline motor 62, a pair of incline legs 63 and a pair of wheels 64. The incline housing 61 is coupled to the frame assembly 20. The incline motor 62 is positioned within the incline housing 61. The pair of incline legs 63 extends from a bottom portion of the incline housing 61 and operationally is coupled to the incline motor 62. Each one of the incline legs 63 includes a lower end. Each one of the wheels 64 is rotatably coupled to a lower end of an associated one of the pair of incline legs 63. The pair of incline legs 63 is pivotally coupled to the incline housing 61 such that the incline legs 63 pivot with respect to the bottom of the incline housing 61 such that the second end of the frame assembly 20 lifts off of a support surface as the pair of incline legs 63 pivot. Thus the frame assembly 20 inclines as the incline legs 63 pivot.

The harness assembly 70 is coupled to the pair of side panel assemblies 27. The harness assembly 70 s designed for holding a quadrepedal animal in a substantially static position relative to the frame assembly 20.

The harness assembly 70 further comprises a pair of vertical riser members 71, a cross-support member 72, a harness receiving member 73 and a harness 74.

The pair of vertical riser members 71 extend upward from a medial portion of each of the pair of side panel assemblies 27.

The cross-support member 72 extends from a first end of a first one of the pair of vertical riser members 21 to a first end of a second one of the pair of vertical riser members 22. The cross-support member 72 is positioned in a substantially parallel spaced relationship with the tread assembly 40. A longitudinal axis of the cross-support member 72 is substantially perpendicular to a longitudinal axis of the frame assembly 20.

The harness receiving member 73 is coupled to the cross-support member 72.

The harness 74 is designed for holding a quadrepedal animal in a substantially static position relative to the frame assembly 20 such that the animal may run in place as the tread assembly 40 rotates. The harness 74 is couplable to the harness receiving member 73.

In an embodiment the pair of vertical support members 71 is substantially telescopic such that the relative height of each of the vertical support members 71 is adjustable. Thus the harness assembly 70 is adjustable to correspond to a height of the animal using the treadmill system 10.

In a further embodiment the harness receiving member 73 is slideable relative to the cross-support member 72 such that the position of the harness 74 relative to the tread assembly 40 is adjustable to correspond to the size and the length of a stride of the animal using the treadmill system 10.

The control assembly 76 is coupled to the frame assembly 20. The control assembly 76 is in electrical communication with the drive motor 51 such that the speed of the drive motor 51 is controlled by the control assembly 76.

The control assembly 76 is in electrical communication with the incline motor 62 such that the amount of incline of the frame assembly 20 induced by pivoting the incline legs 63 relative to the frame assembly 20 is controlled by the control assembly 76.

In an embodiment the control assembly 76 further comprises a safety switch 77 and a safety switch connecting member 78. The safety switch connecting member 78 extends from a harness 74 to the safety switch 77. The safety switch 77 is for stopping the drive motor 51 when the animal moves beyond a predetermined position relative to the tread assembly 40 and the frame assembly 20 such that if the animal becomes tangles or breaks loose from the harness receiving member 73 the drive motor 51 stops.

A first ramp 34 is coupled to a first end of the tread assembly 40 for facilitating moving the animal onto the tread assembly 40. The first ramp 34 extends from the first end of the tread assembly 40 substantially obliquely to a support surface.

A second ramp 35 coupled to a second end of the tread assembly 40 for facilitating moving the animal off of the tread assembly 40. The second ramp 35 extends from the second end of tread assembly 40 substantially obliquely to a support surface.

In use, the animal is placed in the harness. The animal is led up the first ramp and positioned on the tread assembly. The drive motor is started through the control assembly and in turn rotates the tread assembly. The speed of the rotation of the tread assembly and the incline of the frame assembly is controlled by the control assembly. After completing the desired exercise period the animal is disconnected from the harness assembly and led down the second ramp.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A treadmill system comprising:
    a frame assembly, said frame assembly comprising:
        a first pair of vertical support members, each one of said pair of vertical support members having a first end and a second end;
        a first lateral support member extending between a first end of a first one of said first pair of vertical support members and a first end of a second one of said first pair of vertical support members;
        a second pair of vertical support members, each one of said pair of vertical support members having a first end and a second end;
        a second lateral support member extending between a first end of a first one of said second pair of vertical support members and a first end of a second one of said second pair of vertical support members;
        a central brace member extending between a medial portion of said first lateral support member and a medial portion of said second lateral support member;
        a tread assembly rotatably coupled to said frame assembly, said tread assembly being adapted for providing a running surface for a quadrapedal animal under 150 pounds;
        a drive assembly mounted to said frame assembly and coupled to said tread assembly, said drive assembly providing rotation for said tread assembly;
        an incline assembly coupled to said frame assembly, said incline assembly being for selectively raising said second pair of vertical support members whereby said tread assembly inclines relative to a support surface;
        an incline housing coupled to said frame assembly;
        an incline motor positioned within said incline housing;
        a pair of incline legs extending from a bottom portion of said incline housing and operationally coupled to said incline motor, each one of said incline legs having a lower end;
        a pair of wheels, each one of said wheels being rotatably coupled to a lower end of an associated one of said pair of incline legs;
        said pair of incline legs being pivotally coupled to said incline housing such that said incline legs pivot with respect to said bottom of said incline housing such that said second end of said frame assembly lifts off of a support surface as said pair of incline legs pivot whereby said frame assembly inclines as said incline legs pivot, said incline motor having a shaft operationally coupled to each of said pair of incline legs whereby rotation of said shaft pivots said pair of incline legs.

2. The treadmill system of claim 1, wherein said frame assembly further comprises:
    a pair of side panel assemblies, each one of said side panel assemblies being coupled to said second ends of said vertical support members, a first one of said side panel assemblies extending between a first one of said first pair of vertical support members and a first one of said second pair of vertical support members, a second one of said side panel assemblies extending between a second one of said first pair of vertical support members and a second one of said second pair of vertical support assemblies.

3. The treadmill system of claim 2, wherein each one of said pair of side panel assemblies further comprises:
    an upper crossbar member extending between an associated pairing of one of said first vertical support members and one of said second vertical support members, said upper crossbar member being positioned such that said upper crossbar member abuts a top edge of each one of said associated pairing of one of said first vertical support members and one of said second vertical support members;
    a lower crossbar member extending between said associated pairing of one of said first vertical support members and one of said second vertical support members, said lower crossbar member being in a substantially parallel spaced relationship with said upper crossbar member;
    a side panel member coupled to said upper and lower crossbar members, said side panel member extending substantially between said associated pairing of one of said first vertical support members and one of said second vertical support members.

4. The treadmill system of claim 3, further comprising:
    an harness assembly coupled to said pair of side panel assemblies, said harness assembly being adapted for holding a quadrepedal animal in a substantially static position relative to said frame assembly.

5. The treadmill system of claim 4, wherein said harness assembly further comprises:
    a pair of vertical riser members extending upward from a medial portion of each of said pair of side panel assemblies;
    a cross-support member extending from a first end of a first one of said pair of vertical riser members to a first end of a second one of said pair of vertical riser members, said cross-support member being positioned in a substantially parallel spaced relationship with said tread assembly, a longitudinal axis of said cross-support member being substantially perpendicular to a longitudinal axis of said frame assembly, a harness receiving member coupled to said cross-support member;

a harness adapted for holding a quadrepedal animal in a substantially static position relative to said frame assembly such that the animal may run in place as the tread assembly rotates, said harness being couplable to said harness receiving member.

6. The treadmill system of claim 5, wherein said pair of vertical support members being substantially telescopic such that the relative height of each of said vertical support members is adjustable whereby said harness assembly is adjustable to correspond to a height of the animal using said treadmill system.

7. The treadmill system of claim 5, wherein said harness receiving member being slideable relative to said cross-support member such that the position of said harness relative to said tread assembly is adjustable to correspond to the size and the length of a stride of the animal using said treadmill system.

8. The treadmill system of claim 1, wherein said frame assembly further comprises:
  a first longitudinal brace extending between a medial portion of said first one of said first pair of vertical support members and a medial portion of a first one of said second pair of vertical support members;
  a second longitudinal brace extending between a medial portion of said second one of said first pair of vertical support members and a medial portion of said second one of said second pair of vertical support members;
  said first and second longitudinal members substantially providing rigidity to said frame assembly along a longitudinal axis of said frame assembly.

9. The treadmill system of claim 1, wherein said frame assembly further comprises:
  a pair of wheels, each one of said pair of wheels being coupled to a first end of an associated one of said first pair of vertical support members, said pair of wheels being for facilitating moving said treadmill system.

10. The treadmill system of claim 1, wherein said tread assembly further comprises:
  a drive roller having a first end and a second end, said drive roller being substantially cylindrical and having an annular groove located adjacent to said first end, said first end being rotatably coupled to a medial portion of said first one of said first pair of vertical support members, said second end being rotatably coupled to a medial portion of said second one of said first pair of vertical support members;
  a tensioning roller having a first end and a second end, said tensioning roller being substantially cylindrical, said first end being rotatably coupled to a medial portion of said first one of said second pair of vertical support members, said second end being rotatably coupled to a medial portion of said second one of said second pair of vertical support members;
  a pair of tread support members extending between said drive roller and said tensioning roller, a first one of said tread support members extending between said first end of said of said drive roller and said first end of said tensioning roller, a second one of said pair of tread support members extending between said second end of said drive roller and said second end of said tensioning roller;
  a plurality of support rollers, each one of said plurality of support rollers being rotatably coupled to said pair of tread support members, and positioned such that a longitudinal axis of each of said plurality of support rollers is in a substantially perpendicular relationship with a longitudinal axis of each of said tread support members;
  a backing member having a first end and a second end, said first end being coupled to said second end, said backing member being positioned such that an interior surface of said backing member abuts and outer surface of said drive roller, said tensioning roller, and said plurality of support rollers;
  a plurality of tread members coupled to said backing member such that a bottom surface of each one of said plurality of tread members abuts an outer surface of said backing member.

11. The treadmill system of claim 10 wherein each one of said plurality of tread members comprises a material consisting of the group of wood, rubber, or plastic.

12. The treadmill system of claim 1, wherein said drive assembly further comprises:
  a drive motor having a rotating shaft extending from an end portion;
  a drive pulley coupled to said rotating-shaft, said drive pulley having an annular groove;
  a drive belt extending from said drive pulley to a drive roller, said drive belt being positioned in said annular groove of said drive pulley and an annular groove of said drive roller, said drive belt transferring rotational energy from said drive motor to said drive roller such that rotation of said shaft rotates said drive roller;
  a mounting bracket preferably coupled to a medial portion of said tread assembly, said mounting bracket being for holding said drive motor in a static position relative to said frame assembly.

13. The treadmill system of claim 12, further comprising:
  a control assembly coupled to said frame assembly, said control assembly being in electrical communication with said drive motor such that the speed of said drive motor is controlled by said control assembly.

14. The tread-mill system of claim 13, further comprising:
  said control assembly being in electrical communication with said incline motor such that the amount of incline of said frame assembly induced by pivoting said incline legs relative to said frame assembly is controlled by said control assembly.

15. The treadmill system of claim 13, wherein said control assembly further comprises a safety switch and a safety switch connecting member;
  said safety switch connecting member extending from a harness to said safety switch;
  said safety switch being for stopping said drive motor when the animal moves beyond a predetermined position relative to said tread assembly and said frame assembly such that if the animal becomes tangles or breaks loose from said harness receiving member said drive motor stops.

16. The treadmill system of claim 1, further comprising:
  a first ramp coupled to a first end of said tread assembly for facilitating moving the animal onto said tread assembly, said first ramp extending from said first end of said tread assembly substantially obliquely to a support surface;
a second ramp coupled to a second end of said tread assembly for facilitating moving the animal off of said tread assembly, said second ramp extending from said second end of tread assembly substantially obliquely to a support surface.

17. A treadmill system comprising:
a frame assembly, said frame assembly comprising:
   a first pair of vertical support members, each one of said pair of vertical support members having a first end and a second end;
   a first lateral support member extending between a first end of a first one of said first pair of vertical support members and a first end of a second one of said first pair of vertical support members;
   a second pair of vertical support members, each one of said pair of vertical support members having a first end and a second end;
   a second lateral support member extending between a first end of a first one of said second pair of vertical support members and a first end of a second one of said second pair of vertical support members;
   a central brace member extending between a medial portion of said first lateral support member and a medial portion of said second lateral support member;
   a first longitudinal brace extending between a medial portion of said first one of said first pair of vertical support members and a medial portion of a first one of said second pair of vertical support members;
   a second longitudinal brace extending between a medial portion of said second one of said first pair of vertical support members and a medial portion of said second one of said second pair of vertical support members;
   said first and second longitudinal members substantially providing rigidity to said frame assembly along a longitudinal axis of said frame assembly;
   a pair of wheels, each one of said pair of wheels being coupled to a first end of an associated one of said first pair of vertical support members, said pair of wheels being for facilitating moving said treadmill system;
   a pair of side panel assemblies, each one of said side panel assemblies being coupled to said second ends of said vertical support members, a first one of said side panel assemblies extending between a first one of said first pair of vertical support members and a first one of said second pair of vertical support members, a second one of said side panel assemblies extending between a second one of said first pair of vertical support members and a second one of said second pair of vertical support assemblies;
   each one of said pair of side panel assemblies further comprises:
      an upper crossbar member extending between an associated pairing of one of said first vertical support members and one of said second vertical support members, said upper crossbar member being positioned such that said upper crossbar member abuts a top edge of each one of said associated pairing of one of said first vertical support members and one of said second vertical support members;
      a lower crossbar member extending between said associated pairing of one of said first vertical support members and one of said second vertical support members, said lower crossbar member being in a substantially parallel spaced relationship with said upper crossbar member;
      a side panel member coupled to said upper and lower crossbar members, said side panel member extending substantially between said associated pairing of one of said first vertical support members and one of said second vertical support members;
   a tread assembly rotatably coupled to said frame assembly, said tread assembly being adapted for providing a running surface for a quadrapedal animal under 150 pounds;
   said tread assembly further comprises:
      a drive roller having a first end and a second end, said drive roller being substantially cylindrical and having an annular groove located adjacent to said first end, said first end being rotatably coupled to a medial portion of said first one of said first pair of vertical support members, said second end being rotatably coupled to a medial portion of said second one of said first pair of vertical support members;
      a tensioning roller having a first end and a second end, said tensioning roller being substantially cylindrical, said first end being rotatably coupled to a medial portion of said first one of said second pair of vertical support members, said second end being rotatably coupled to a medial portion of said second one of said second pair of vertical support members;
      a pair of tread support members extending between said drive roller and said tensioning roller, a first one of said tread support members extending between said first end of said of said drive roller and said first end of said tensioning roller, a second one of said pair of tread support members extending between said second end of said drive roller and said second end of said tensioning roller;
      a plurality of support rollers, each one of said plurality of support rollers being rotatably coupled to said pair of tread support members, and positioned such that a longitudinal axis of each of said plurality of support rollers is in a substantially perpendicular relationship with a longitudinal axis of each of said tread support members;
      a backing member having a first end and a second end, said first end being coupled to said second end, said backing member being positioned such that an interior surface of said backing member abuts and outer surface of said drive roller, said tensioning roller, and said plurality of support rollers;
      a plurality of tread members coupled to said backing member such that a bottom surface of each one of said plurality of tread members abuts an outer surface of said backing member;
   wherein each one of said plurality of tread members comprises a material consisting of the group of wood, rubber, or plastic;
   a drive assembly mounted to said frame assembly and coupled to said tread assembly, said drive assembly providing rotation for said tread assembly;
   wherein said drive assembly further comprises:
      a drive motor having a rotating shaft extending from an end portion;
      a drive pulley coupled to said rotating shaft, said drive pulley having an annular groove;
      a drive belt extending from said drive pulley to a drive roller, said drive belt being positioned in said annular groove of said drive pulley and an annular groove of said drive roller, said drive belt transferring rotational energy from said drive motor to said drive roller such that rotation of said shaft rotates said drive roller;

a mounting bracket preferably coupled to a medial portion of said tread assembly, said mounting bracket being for holding said drive motor in a static position relative to said frame assembly;

an incline assembly coupled to said frame assembly, said incline assembly being for selectively raising said second pair of vertical support members whereby said tread assembly inclines relative to a support surface such as the ground;

wherein said incline assembly further comprises:
an incline housing coupled to said frame assembly;
an incline motor positioned within said incline housing;
a pair of incline legs extending from a bottom portion of said incline housing and operationally coupled to said incline motor, each one of said incline legs having a lower end;
a pair of wheels, each one of said wheels being rotatably coupled to a lower end of an associated one of said pair of incline legs;

said pair of incline legs being pivotally coupled to said incline housing such that said incline legs pivot with respect to said bottom of said incline housing such that said second end of said frame assembly lifts off of a support surface as said pair of incline legs pivot whereby said frame assembly inclines as said incline legs pivot;

an harness assembly coupled to said pair of side panel assemblies, said harness assembly being adapted for holding a quadrepedal animal in a substantially static position relative to said frame assembly;

wherein said harness assembly further comprises:
a pair of vertical riser members extending upward from a medial portion of each of said pair of side panel assemblies;
a cross-support member extending from a first end of a first one of said pair of vertical riser members to a first end of a second one of said pair of vertical riser members, said cross-support member being positioned in a substantially parallel spaced relationship with said tread assembly, a longitudinal axis of said cross-support member being substantially perpendicular to a longitudinal axis of said frame assembly,
a harness receiving member coupled to said cross-support member;
a harness adapted for holding a quadrepedal animal in a substantially static position relative to said frame assembly such that the animal may run in place. as the tread assembly rotates, said harness being couplable to said harness receiving member;

wherein said pair of vertical support members being substantially telescopic such that the relative height of each of said vertical support members is adjustable whereby said harness assembly is adjustable to correspond to a height of the animal using said treadmill system;

wherein said harness receiving member being slideable relative to said cross-support member such that the position of said harness relative to said tread assembly is adjustable to correspond to the size and the length of a stride of the animal using said treadmill system;

a control assembly coupled to said frame assembly, said control assembly being in electrical communication with said drive motor such that the speed of said drive motor is controlled by said control assembly;

said control assembly being in electrical communication with said incline motor such that the amount of incline of said frame assembly induced by pivoting said incline legs relative to said frame assembly is controlled by said control assembly;

wherein said control assembly further comprises a safety switch and a safety switch connecting member;

said safety switch connecting member extending from a harness to said safety switch;

said safety switch being for stopping said drive motor when the animal moves beyond a predetermined position relative to said tread assembly and said frame assembly such that if the animal becomes tangles or breaks loose from said harness receiving member said drive motor stops;

a first ramp coupled to a first end of said tread assembly for facilitating moving the animal onto said tread assembly, said first ramp extending from said first end of said tread assembly substantially obliquely to a support surface;

a second ramp coupled to a second end of said tread assembly for facilitating moving the animal off of said tread assembly, said second ramp extending from said second end of tread assembly substantially obliquely to a support surface.

* * * * *